Oct. 25, 1966 W. A. HERPICH ETAL 3,280,994
REFUSE COLLECTING VEHICLE
Filed Oct. 29, 1965 3 Sheets-Sheet 3
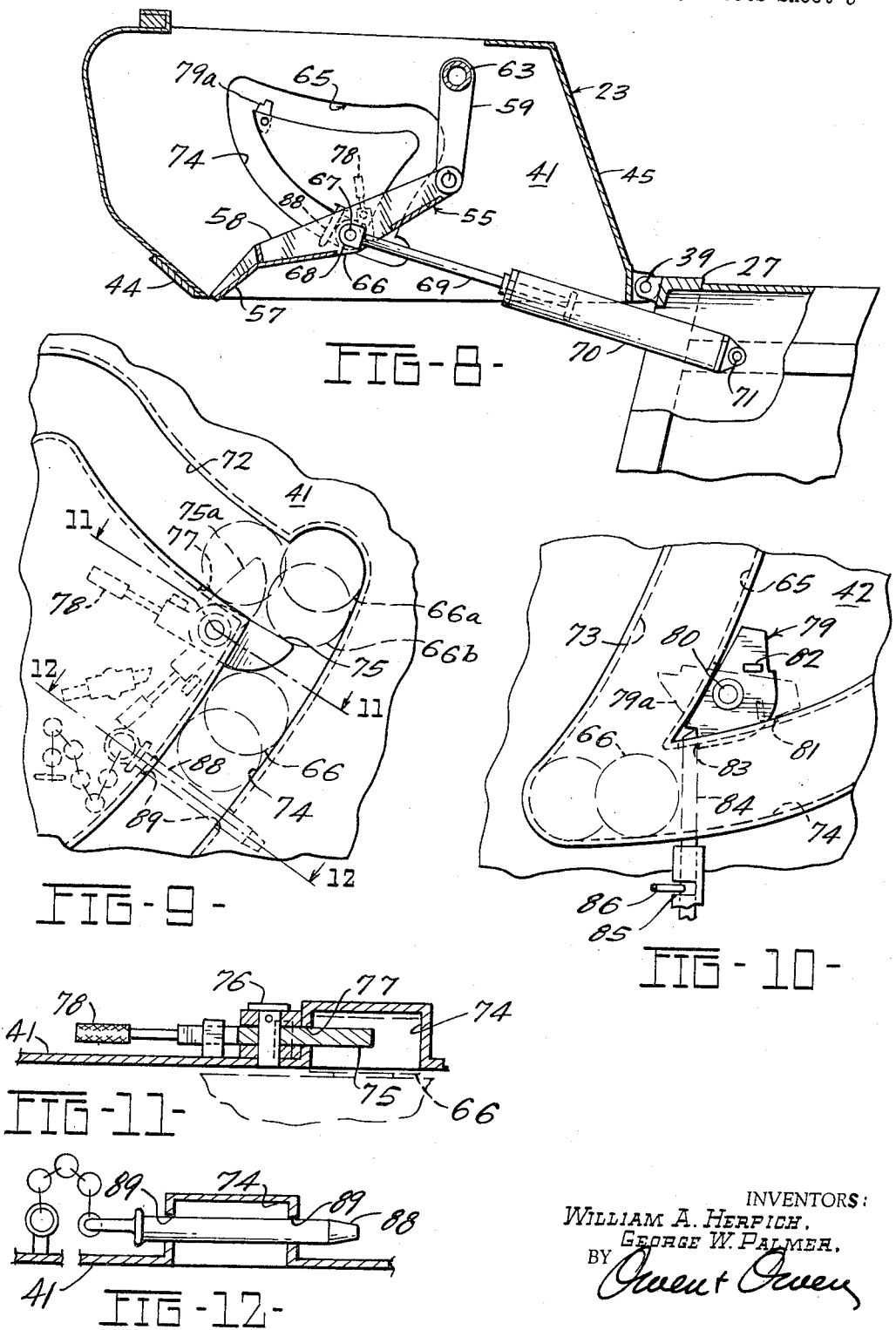
INVENTORS:
WILLIAM A. HERPICH,
GEORGE W. PALMER,
BY
ATT'YS.

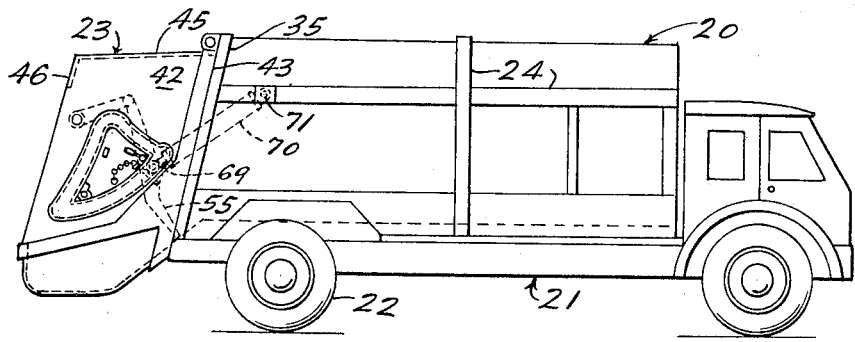
FIG-1-
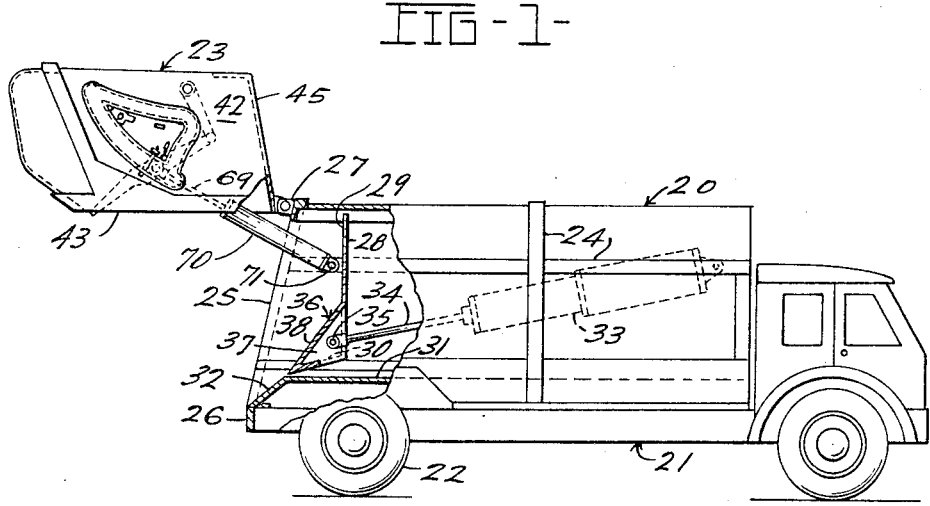
FIG-2-
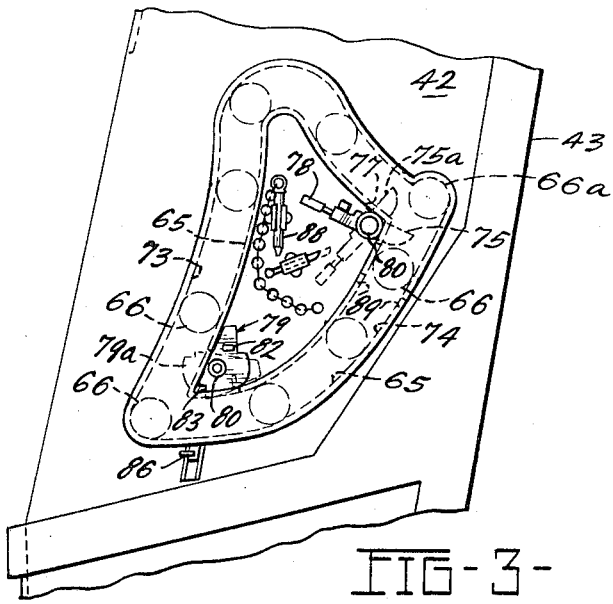
FIG-3-
INVENTORS:
WILLIAM A. HERPICH,
GEORGE W. PALMER,
BY
ATT'YS Oct. 25, 1966   W. A. HERPICH ETAL   3,280,994
REFUSE COLLECTING VEHICLE
Filed Oct. 29, 1965   3 Sheets-Sheet 2
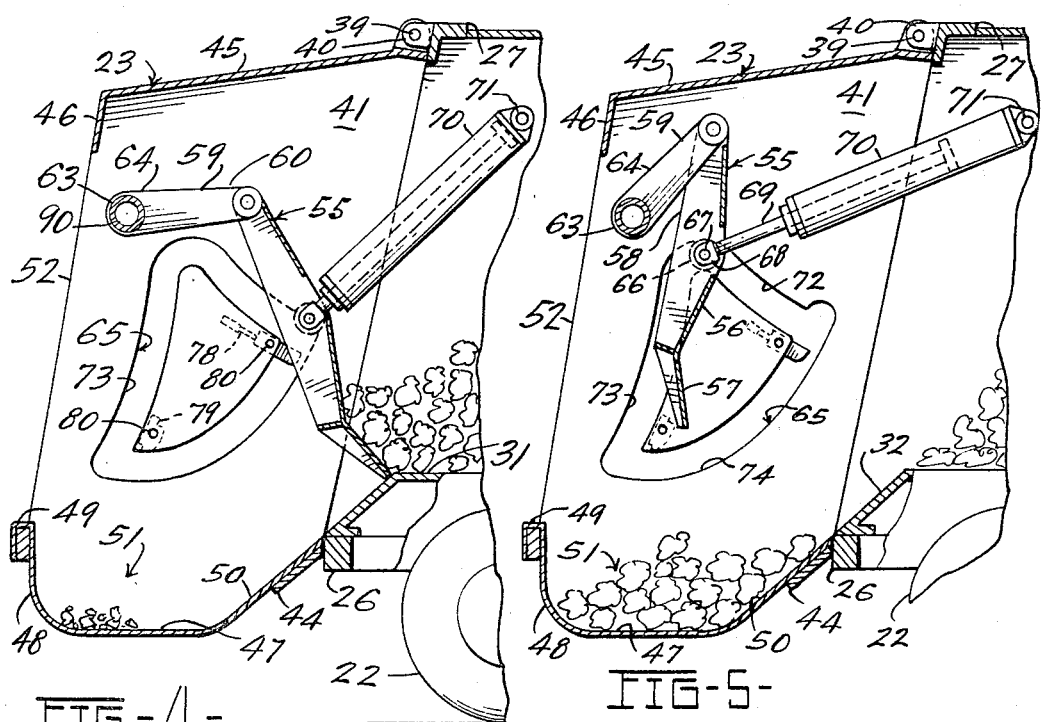
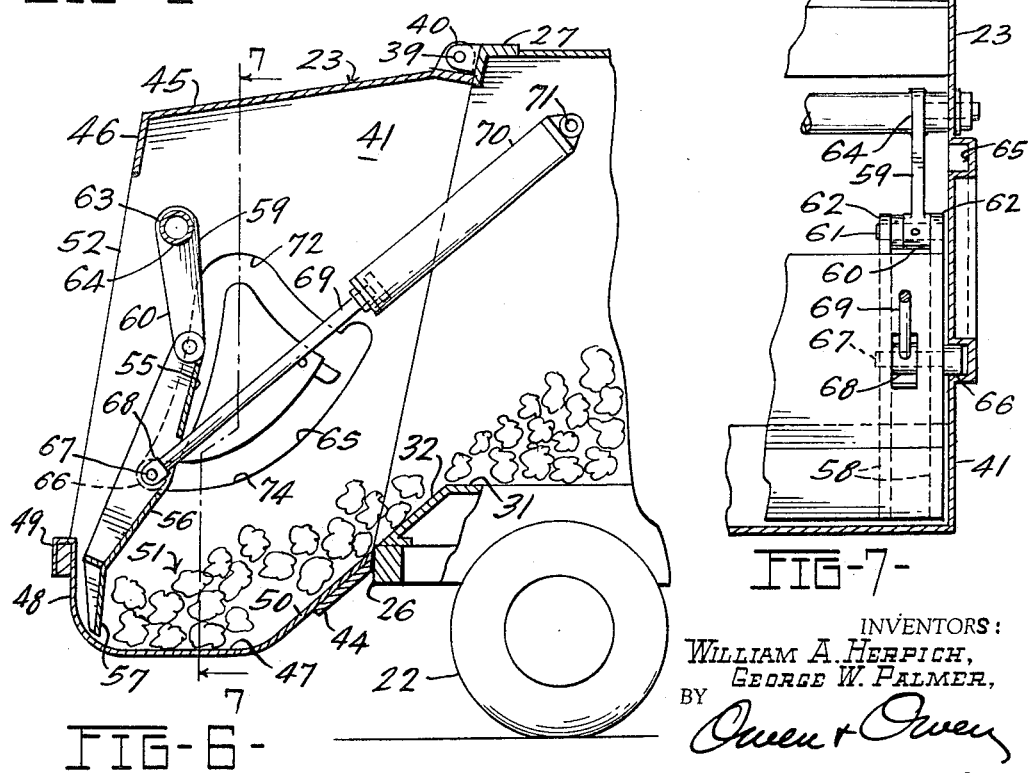
INVENTORS:
WILLIAM A. HERPICH,
GEORGE W. PALMER,
BY Owen + Owen
ATT'YS.

United States Patent Office 3,280,994
Patented Oct. 25, 1966

3,280,994
REFUSE COLLECTING VEHICLE
William A. Herpich and George W. Palmer, Galion, Ohio, assignors to Hercules Galion Products, Inc., Galion, Ohio, a corporation of Ohio
Filed Oct. 29, 1965, Ser. No. 505,701
7 Claims. (Cl. 214—83.3)

This invention relates to refuse collecting vehicles of the type customarily employed on city streets for the collection of trash, garbage, and other refuse from containers placed at the curbs of the streets. The application is a continuation in part of our co-pending applications Serial No. 351,442 filed March 12, 1964, now Patent No. 3,233,760, and Serial No. 426,289 filed January 18, 1965.

Vehicles of this general type having hoppers at their rear ends are known and in some of these vehicles, at least, the hoppers and mechanisms for moving the refuse from the hoppers into the bodies of the vehicles are both contained in and supported by end gates which can be elevated out of the way for the discharge of the collected material from the bodies of the trucks. Some of these vehicles are of the dumping type wherein the body is tilted to dump the refuse after the tailgate has been opened, and others are of the ejection type in which an ejection plate is moved backwardly through the body for pushing the refuse out of the body after the tailgate has been opened.

Some vehicles which have been utilized for the above mentioned purpose have extremely complex mechanisms in their tailgates, including both liftable hoppers, packer blades, compacting blades, and complex linkages with the resulting requirement that the mechanism be equipped with various types of limit switches and other control means. All of these extra devices and accessories add cost to the vehicles and are liable to damage and result in malfunction.

Because it is difficult to adequately train the workers who load refuse into vehicles of this type to distinguish between those items of refuse which can adequately be handled by the vehicle and those which cannot, for example, bed springs, overstuffed chairs, and the like, those loading mechanisms which require the matching of moving parts in order to effect transfer of refuse from the hopper into the vehicle are very likely to be damaged during use.

Because an item of refuse sometimes becomes jammed into one side of the vehicle, undue force has been placed on portions of packer blades and connecting mechanisms of many of the prior art vehicles.

It is the principal object of the instant invention to provide a refuse collecting vehicle having a force transmitting member which tends to equalize forces along the packer blade.

It is another object of the instant invention to provide a refuse collecting vehicle of the rear end loading type wherein but a single set of hydraulic cylinders is employed for effecting transfer of the refuse from the collecting hopper into the body of the vehicle as well as the opening of the tailgate to permit expulsion of the collected refuse from the body of the vehicle.

It is a still further object of the instant invention to provide a refuse collecting vehicle having a rear end hopper wherein a single packer blade is employed for sweeping the refuse out of the hopper and for transferring it into the body of the vehicle without any additional mechanism being necessary in order to lift the refuse into position for engagement by the packer blade.

Another and more specific object of the instant invention is to provide a refuse collecting vehicle having a hopper on its rear end and a movable packer blade guided for movement through the hopper by a pair of tracks which define the path of excursion of the lower end of the packer blade and which have means for preventing inadvertent reversal of direction of movement of the blade and yet providing for such reversal of direction when desired.

These and other more specific objects and advantages of a refuse collecting vehicle embodying the invention will be better understood from the specification which follows and from the drawings in which:

FIG. 1 is a side view in elevation of a refuse collecting vehicle embodying the invention, being shown with its refuse packer blade in position to retain the refuse within the main body of the vehicle and to provide for the emptying of refuse cans into a receiving hopper at the rear of the vehicle;

FIG. 2 is a view similar to FIG. 1 but having parts broken away and showing the vehicle tailgate, which comprises the receiving hopper and the packing mechanism, swung upwardly out of the way so as to permit the ejection of refuse from the main body of the vehicle;

FIG. 3 is a fragmentary, side view of the vehicle tailgate and showing in particular the track switch, track gate, and track stop and indicating by dashed lines various positions of a track roller as it traverses a lower closed, multi-sided track.

FIGS. 4, 5, and 6 are fragmentary, diagrammatic views taken generally along a longitudinal vertical plane of the vehicle shown in FIG. 1 and show the refuse moving mechanism at several successive positions in its cycle of operation in order to effect the transfer of a quantity of refuse from the receiving hopper into the interior of the main body of the vehicle;

FIG. 7 is a fragmentary view, partially sectional, taken along the line 7—7 of FIG. 6 and showing in particular a horizontally extending torque tube;

FIG. 8 is a view similar to FIGS. 4-6, inclusive but illustrating how the tailgate of a vehicle embodying the invention is elevated out of the way so as to provide for the ejection of refuse from the main body of the vehicle;

FIG. 9 is a fragmentary view in elevation, shown on an enlarged scale, of details of a track switch and a track stop located in the lower closed guide track;

FIG. 10 is a fragmentary view in elevation of a track gate located in the lower closed guide track, the view being taken from the exterior of the tailgate;

FIG. 11 is a fragmentary, sectional view taken along the line 11—11 of FIG. 9; and FIG. 12 is a fragmentary, sectional view taken along the line 12—12 of FIG. 9.

A refuse collecting vehicle embodying the invention has a hollow, generally rectangular body 20 mounted in conventional fashion upon a truck chassis, generally indicated by reference number 21, and overlying, in part at least, rear wheels 22 of the chassis 21. The vehicle has a tailgate, generally indicated by the reference number 23, and shown in down or "closed" position in FIG. 1 and in elevated or "open" position in FIG. 2. The body 20 preferably is fabricated from sheet metal forming an enclosure of rectangular, vertical cross section reinforced, for example, by external channels 24 and having an open rear end defined by box channels 25 along the vertical edges, a bottom cross member 26 and a top cross member 27.

An ejection and precompaction plate 28 is slidingly mounted within the body 20 for movement from a position near the front of the body 20 to a rearmost position therein, illustrated in FIG. 2. The plate 28 is shown in FIG. 2 in a position spaced some six or eight inches forwardly of its rearmost position. The plate 28 comprises a vertically extending bulkhead 29 and a rearwardly extending incline 30. The ejection and precompaction plate 28 travels back and forth longitudinally within the body 20, being moved over a floor 31 thereof. The floor 31 terminates in a rear incline 32 leading to the bottom rear cross frame 26. A hydraulic cylinder 33 (FIG. 2) is pivotally connected at the center of the upper front corner of the top and front wall of the body 20 and has a rod 34 pivotally connected to a swivel member 35 at the center of the ejection plate 28. A generally triangular enclosure 36, having spaced vertical walls 37 and a back wall 38, extends between the bulkhead 29 and incline 30 at the rear center of the ejection plate 28. The enclosure 36 is hollow in its interior and provides room into which the rod 34 and cylinder 33 swing when the ejection plate 28 is moved to the front of the body, as well as bracing the ejection plate bulkhead 29 and incline 30.

The entire tailgate 23, as a unit, is pivotally mounted at the upper rear corner of the body 20 by a pivot rod 39 (FIGS. 4 and following), which extends transversely across the body 20 and the tailgate 23, being engaged with a plurality of ears 40 welded or otherwise secured to the top cross member 27 of the body 20 and several similar elements (not shown) which are welded to the upper inner corner of the tailgate 23.

The tailgate 23 comprises opposed vertical and parallel sidewalls 41 and 42 that extend rearwardly from frame channels 43 which define the front vertical margins of the tailgate 23 and which lie adjacent the box channels 25 at the rear sides of the body 20 when the tailgate 23 is in its closed position. A bottom cross frame 44 (FIG. 2) of the tailgate 23 similarly lies adjacent the bottom cross frame 26 of the vehicle body 20 when the tailgate 23 is in its lowered position. The tailgate 23 has a generally flat top 45 and a canopy 46 extending downwardly and rearwardly from the back edge of the top 45 and across between the upper rear corners of the sidewalls 41 and 42. The bottom of the tailgate 23 comprises a bottom plate 47 an upwardly extending rear wall 48 having a return lip 49, and an upwardly and forwardly inclined front wall 50. The cross frame 44 is welded beneath and to the upper front edge of the inclined front wall 50 of the tailgate 23 and the front wall 50 is inclined at the same angle as the rear incline 32 of the floor 31 of the body 20 so that when the tailgate 23 is in closed position (FIGS. 1 and 4–6), the two are continuations of each other. The tailgate bottom plate 47, rear wall 48 and front wall 50 extend horizontally between the lower portions of the sidewalls 41 and 42 of the tailgate 23, forming a refuse receiving hopper, generally indicated by the reference number 51.

The lower, horizontal edge of the canopy 46, the upper horizontal edge of the junction between the rear wall 48 and lip 49, and the back edges of the sidewalls 41 and 42 define a large rectangular access opening 52 into the tailgate 23 from the back of the vehicle. During the collection of refuse, the tailgate 23 is held in its closed position by suitable latching means.

A packer blade 55 is mounted for movement within the tailgate 23 for moving refuse out of the hopper 52 and into the interior of the body 20. The packer blade 55 extends all the way across the tailgate 23 between the sidewalls 41 and 42 thereof, and includes an upper section 56 and a lower, forwardly inclined section 57. A plurality of generally vertical reinforcing ribs 58 are welded or otherwise secured to the back faces of the upper section 56 and the lower section 57.

The uppermost end of the packer blade 55 is guided during its cycle of operations by a pair of opposed guide links 59. Each of the guide links 59 has a first end 60 which is pivotally mounted by a pivot pin 61 which extends between upper projections 62 located on adjacent ones of the reinforcing ribs 58 (see FIG. 7).

A torque tube 63 extends horizontally between the opposed sidewalls 41 and 42 of the tailgate 23. The torque tube 63 is suitably journaled to each of the sidewalls 41 and 42 at locations adjacent the upper rear corners thereof (FIGS. 4–6).

Each of the guide links 59 has a second end 64 which is welded or otherwise fixably mounted to the torque tube 63 (FIG. 7).

If a large object, for example, a mattress, becomes wedged beneath one side of the packer blade 55 and, for example, the bottom plate 47 of the tailgate 23 there is a tendency for the packer blade 55 to twist as the packer blade cylinder or cylinders continue to urge the packer blade toward the position shown in FIG. 4. In apparatus, according to the present invention at least a portion of this torsion force is transmitted along the torque tube 63. Therefore, the torque tube 63 tends to equalize the forces acting along the lateral span of the packer blade 55.

The two guide links 59 are parallel to each other so that the packer blade 55 extends across the tailgate 23 in a perpendicular relationship with the side 41 and 42.

The path of movement of the packer blade 55 during a packing excursion is guided by a pair of closed, three-sided tracks, generally indicated by the reference number 65. The two tracks 65 in the sidewalls 41 and 42 are identically spaced on opposite sides of the tailgate 23 and each of the tracks 65 guides a track roller 66 (FIG. 7), one of which is supported at each side of the packer blade 55 at approximately the midpoint of its upper section 56. Each of the track rollers 66 is rotatably mounted on the end of a stub rod 67, the stub rod 67 being fixed in and extending between the two adjacent reinforcing channels 58 at each side of the packer blade 55 (FIG. 7). Each of the stub rods 67 also carries a trunnion 68 to which the end of one of a pair of piston rods 69 is connected. The two piston rods 69 are movable in hydraulic cylinders 70, one at each side of the vehicle, and which cylinders 70 apply power to the packer blade 55 to carry it through its loading excursion as well as to effectuate opening of the tailgate 23 in a manner to be described below. The upper end of each of the cylinders 70 is pivotally mounted by a suitable support pin 71 which is carried by the body 20.

The three-sided closed tracks 65 in sidewalls 41 and 42 of the tailgate 23, have upwardly and rearwardly inclined legs 72 connected through arcs of relative small radius to generally vertically extending rear legs 73. The rear legs 73 extend downwardly, generally parallel to the rear edges of the respective sidewall 41 and 42 and terminate at a level above the bottom plate 47 of the tailgate 23 such that when the track rollers 66 reach the bottoms of the rear legs 73 of the tracks 65, the bottommost edge of the packer blade 55 is adjacent the bottom plate 47 (FIG. 6). The tracks 65 also have forwardly and upwardly extending legs 74 which intersect both the lower ends of the rear legs 73 and the front end of the legs 72.

In FIG. 4, the packer blade 55 is shown in the position which it occupies during the loading of refuse into the receiving hopper 52. It will be noted that the bottommost edge of the packer blade 55 is located inwardly of the body 20 beyond the front end of the front wall 50 of the tailgate 23, and at the line of intersection of the level portion of the floor 31 with the upper corner of the rear incline 32. The position shown in FIG. 4 retains previously loaded refuse within the body 20 and prevents it from falling downwardly back into the hopper 51 during transit between collection locations or during intervals between actuation of the packer blade 55 while the workers are dumping refuse into the hopper 51 through the access opening 52 at the rear of the tailgate 23.

A normal loading excursion of the packer blade 55 consists of counterclockwise movement of its track rollers 66 around the respective closed tracks 65, progressing, in sequence, from the position shown in FIG. 4 through the position shown in FIG. 5, to move the lower edge of the packer blade 55 backwardly over the mass of refuse in the hopper 51, downwardly to the position shown in FIG. 6 so that the lower edge of the packer blade 55 slides down the inner side of the rear wall 48 and then forwardly and upwardly thereby scooping the refuse upwardly out of the hopper 51 and into the body 20 and, finally, back to the position illustrated in FIG. 4.

Rearward movement of the packer blade 55 from the position illustrated in FIG. 4 is achieved by feeding oil under pressure to the cylinders 70 to extend their rods 69. However, because the track rollers 66 are located at the intersection of the track legs 72 and 74, in this most forward position of the packer blade 55 (see FIG. 4), means must be provided to insure that upon the initial extension of the cylinder rods 69 and movement of the packer blade 55, it will be guided upwardly and rearwardly along the track legs 72 rather than downwardly and back along the track legs 74.

A track switch 75 (FIG. 9) is pivotally mounted at the intersection of each of the track legs 74 and 72 by a pivot pin 76 and, in its normal position, extends substantially across the upper part of the track leg 74 in line to be engaged by the track roller 66 as it progresses up the track leg 74 to the upper forward position illustrated in FIG. 4. The track switch 75 extends through a slot 77 (FIG. 11) cut in the inner walls of the track legs 74 and 72 and has an outside handle 78 secured thereto. As the roller 66 progresses up the track leg 74 it first engages the inwardly protruding end of the switch 75 and swings it around (counterclockwise FIG. 9) through the intermediate position shown in dotted lines and indicated by the reference number 75a in FIG. 9 to its uppermost position. The portion of inner wall of the track leg 72 which defines the rear of the slot 77 serves as a stop to prevent further counterclockwise movement of the switch after it has reached the uppermost position. Immediately after the passage of the roller 66 beyond the track switch 75, the roller 66 moves to the upper inner position indicated by the reference number 66a in FIG. 9 and gravity causes the track switch 75 to swing back downwardly to the position indicated in solid lines in FIG. 9. Further clockwise rotation of the switch 75 is prevented because the handle 78 engages the inner wall of the track leg 72, which serves as a stop. The position of the roller indicated by the reference number 66a in FIG. 9 is the rest or the traveling position shown in FIG. 4 of the drawings, with the packer blade 55 at the upper forward position.

At the beginning of the next excursion of the packer blade 55, the track roller 66 moves from the positions shown in dotted lines and indicated by the reference number 66a to the position also shown in dotted lines indicated by the reference number 66b in FIG. 9 where they strike the upper surface of the track switches 75. As the piston rods 69 continue to be extended out of their cylinders 70, because of the engagement of the rollers 66 with the track switches 75, the rollers 66 are deflected backwardly and up along the track legs 72 to commence the excursion of the packer blade 55 backwardly and over the refuse in the hopper, moving to the position illustrated in FIG. 5.

As the packer blade 55 approaches the rearward lower position i.e., when it reaches the position illustrated in FIG. 6, having moved vertically downward behind the charge of refuse in the hopper 51, the track rollers 66 approach the intersection between the rear track legs 73 and the rear lower ends of the track legs 74. At this point, the track rollers 66 engage the inwardly protruding ends of track gates 79 (FIG. 10).

Each of the track gates 79 is substantially semicircular in shape, being cut from relatively heavy sheet steel, for example, and is pivotally mounted by a heavy pin 80 at the junction of the respective rear track leg 73 and the lower track leg 74. A slot 81 is cut through the horizontal surface of the inner sides of the track legs 73 and 74 at the intersection therebetween and the track gate 79 is pivotally mounted by the pin 80 to swing through the slot 81. A counterweight 82 (see FIG. 10) is secured on the outer surface of the gate 79 in such position as to urge the gate 79 into the dashed line position 79a in FIG. 10 and also to function as a stop.

When the packer blade 55 is moved downwardly with the rollers 66 moving along the rear track legs 73, the rollers 66 engage the upper horizontal edges of the track gates 79, camming them downwardly and displacing them outwardly from the rear track legs 73, as shown by the solid lines in FIG. 10. After the track rollers 66 pass the track gates 79, the counterweights 82 swing the track gates 79 back into track obstructing position, as shown in dashed lines in FIG. 10. Therefore, when the track rollers 66 reach the bottom of the intersections between the rear track legs 73 and the lower track legs 74, and the hydraulic connections to the actuating cylinders 70 are reversed, it is impossible for the track rollers 66 to go back up the rear track legs and the continuation of the excursion of the packer blade 55 from that point forwardly through the tailgate 23 is assured.

If material is jammed in the lower part of the hopper 51 or, for some other reason the operator desires to traverse the packer blade 55 back upwardly from the rear lowermost position, i.e. to roll the track rollers 66 back up the rear track legs 73 the track gates 79 can be swung out of the way, as illustrated by the solid lines in FIG. 10. It will be observed that at the rear upper corner of each of the track gates 79 there is cut a rectangular notch 83 which is aligned with the end of a bolt 84, shown in an upper or active position in FIG. 10. The bolt 84 slides in a slotted tube 85 positioned on the exterior of the respective tailgate sidewall 41 or 42 and accessible from the exterior of the vehicle. The bolt 84 has a handle 86 by which the operator may slide the bolt 84 vertically and which can be swung angularly and horizontally into a circumferential slot 87 cut in the tube 85 to lock the bolt 84 in its uppermost position.

The operator grasps the counterweight 82 and swings the track gate 79 into its uppermost position, placing the notch 83 in alignment with the bolt 84. If the gate 79 is not swung to its completely retracted position, when the operator slides the bolt 84 upwardly, it will not move high enough for the handle 86 to be swung horizontally into the slot 87. If, however, the operator has swung the track gate 79 into completely inoperable position, the notch 83 is aligned with the end of the bolt 84 and the operator can lock the bolt 84 in its uppermost position and the track gate 79 in its retracted position, as illustrated in FIG. 10. In addition to locking the track gates 79 in their retracted position, the bolts 84 also extend across the lower rear ends of the horizontal track legs 74 and prevent the entry of the track rollers 66 into the track legs 74.

Under the circumstances just described, therefore, when the track rollers 66 reach the intersection of the ends of the track legs 73 and 74 and the operator disengages the automatic track gates 79 and bolts them into retracted position, as shown in FIG. 10, when the hydraulic connections to the actuating cylinders 70 are reversed, the packer blade 55 is moved upwardly from this position with the track rollers 66 running back up the rear track legs 73. This permits the operator to remove or disengage whatever material may have jammed the packer blade 55 in its lower rearmost position without risking damage to other parts of the mechanism which would result if it were necessary to carry the packer blade 55 forwardly through an excursion before the jam could be cleared.

After relieving the jam or cleaning away the material which is causing the trouble, the operator releases the bolts 84, dropping them into their lower position and allowing the automatic track gates 79 to swing back into operative position and then reverses the hydraulic connections to the actuating cylinders 70 to cause the packer blade 55 to move downwardly to the lower and rearmost position and thence, upon another reversal of such connections, to move forwardly along the lower track legs 74 for sweeping refuse out of the tailgate 23.

When the track rollers 66 reach the bottom intersection of the downwardly extending rear track legs 73 and the lower forwardly extending track legs 74, the packer blade 55 is inserted fully behind the load of refuse in the hopper 51 and, either after clearing a jam if one existed or in a routine cycle of operation, the controls to the cylinders 70 are reversed to retract their piston rods 69 and pull the packer blade 55 forwardly moving it along a path guided by the lower track legs 74 to sweep the refuse forwardly out of the hopper 51. The packer blade 55 moves from the position illustrated in FIG. 6 and toward the position illustrated in FIG. 4 as the track rollers 66 run up the lower track legs 74.

The cycle is completed when the packer blade 55 and its associated parts return again to the position shown in FIG. 4 at which time suitable controls are actuated to relieve the hydraulic pressure on the cylinders 70 and to neutralize their controls for the initiation of a subsequent cycle.

During packing cycles as just described, the ejection plate 28, which travels back and forth in the body 20, is utilized for the purpose of precompacting refuse moved into the body 20 upon each actuation of the packer blade 55. For example, when the body 20 is empty, at the beginning of a route of refuse collection, the operator actuates suitable controls which extends the rod 34 out of its cylinder 33 to move the ejection and precompaction plate 28 backwardly in the body 20 to a position, say two or three feet from its rearmost position (FIG. 2). The ejection and precompaction plate 28 then forms a front bulkhead on the space into which the packer blade 55 feeds refuse. Oftentimes, refuse contains large bulky objects such as corrugated cardboard boxes, and the like, which occupy excessive space in the interior of the body 20 unless they are compacted or crushed during their movement into the body 20. The power of the two packer blade cylinders 70 is such that when the packer blade 55 is moved from the position shown in FIG. 6 to the position shown in FIG. 3 and thence to the position in FIG. 4, sufficient force is applied to crush corrugated cardboard boxes, flattening them out to eliminate the otherwise wasted space within the body 20. After a number of packing cycles of the packer blade 55 have been completed and when the operator's experience teaches him that the space between the rear side of the ejection plate 28 and the packer blade 55 is filled with the refuse in properly precompacted condition, he actuates the controls to draw the rod 34 somewhat into its cylinder 33 and thereby to move the ejection and precompaction plate 28 forward in the body 20. He stops it some two or three feet in front of its previous position to provide space behind the bulkhead for the movement of additional charges of refuse. During the entire travel of the refuse vehicle, the operator continues to move the ejection and precompaction plate 28 forwardly in suitable increments of travel after each set or series of refuse loading cycles of the packer blade 55.

Successive loads of refuse from the hopper 52 gradually fill the body 20 with the ejection plate 28 being moved forwardly until the refuse is so solidly packed that the body must be emptied. If the refuse is solidly packed, when the packer blade 55 approaches the end of a cycle, the pressure in the cylinders 70 reaches a level such that it opens a presure relief valve (not shown) which is set at a value to prevent structural damage, and the packer blade movement stops. The pressure relief may be of any conventional type and is located in the hydraulic circuit leading to the cylinders 70. Cessation of movement of the packer blade 55 signals the operator that the body is fully loaded so he departs for the dump or other discharge location, such as an incinerator.

In order to elevate the tailgate 23, the operator inserts a pair of stops 88 through aligned holes 89 in the front and rear walls of the track legs 74, as shown in FIGS. 9 and 12. However, prior to inserting the stops 88, the track rollers 66 are moved upwardly in the track legs 74 until they are above the aligned holes 89 (see FIG. 9).

If the track rollers 66 are in the position shown in solid lines in FIG. 9 wherein the track rollers 66 are above the aligned holes 89 but below the track switches 75, the operator merely inserts the stops 88 in the aligned holes 89. The track rollers 66 are then moved downwardly in the track legs 74 until they engage the stops 88.

If however, the track rollers 66 have already moved upwardly in the track legs 74 and have passed the track switches 75 (dashed line position 66a), after ineserting the stops 88 the operator swings the track switches 75 from the position shown in solid lines in FIGS. 9 and 11 to the position shown in dotted lines in FIG. 9 and indicated therein by the reference number 75a. The track switches 75 are swung into these positions by grasping the handles 78 and swinging them downwardly. When the track switches 75 are in the position 75a the track rollers 66 can be moved downwardly form their upper inner position 66a, down the track legs 74, until they engage the stops 88.

In either event, prior elevating the tailgate 23 the operator must release the tailgate latch means. Continued actuation of the cylinders 70, with the hydraulic controls in a reverse setting, extends their piston rods 69 and, acting through the stops 88, swings the entire tailgate backwardly and upwardly to the position illustrated in FIG. 8, completely opening the rear end of the body 20. The operator then actuates controls to move the ejection plate plate 28 backwardly through the body 20 to its rearmost position which ejects all of the refuse from the body 20.

The operator then reverses the hydraulic controls to the two packer blade cylinders 70, withdrawing their rods 68, and lowering the tailgate 23 downwardly to its closed position. Continued retraction of the rods 68 from the position thus achieved (FIG. 8) back to the position illustrated in FIG. 4 restores the packer blade 55 to its rest position. The operator then withdraws the stops 88 from the track legs 74 and releases the handles 78 so that the track switches 75 swing back downwardly across the upper ends of the track legs 74 into normal operating position.

Because the packer blade 55 is guided at both of its upper edges by the guide links 59 and at both sides of its center by the rollers 66 which run in the closed tracks 65, the packer blade 55 is firmly guided during its movement through the tailgate and maintained "square" in the gate.

The positioning of the torque tube 20, which mounts the guide links 59 is an important feature of the present invention.

As the packer blade 55 and the hydraulic cylinders 70, including the piston rods 69 move through a packing cycle they travel along a path of movement having an outer margin.

The torque tube 20 is journaled to the respective sidewalls 41 and 42 whereby it has a longitudinal axis of rotation 90 exterior of the outer clearance margin. Therefore, the refuse gate or opening at the rear of the vehicle 20 has no restrictions or structural members extending across such opening as was true in many prior art vehicles of this type.

It has also been found that pivoting the guide links 59 around the longitudinal axis of rotation 90 located in the upper rear corners of the sidewalls 41 and 42 has several additional advantages. The torque tube 63 and the guide links 59 are essentially removed from the refuse in the hopper thereby eliiminating fouling of the pivotal connections.

Also, when the torque tube 63 is mounted at this location the links remain in tension throughout the loading cycle.

The bottom edge of the packer blade 55 must translate through a path (FIGS. 4-6) wherein the edge meets a point at the top of the floor incline 32, translates rearwardly over refuse in the hopper 51, and then translates a large relative distance downwardly behind the refuse. The path determinates the effective capacity of the hopper and it has been found that a vehicle 20, according to the present invention, having the axis of rotation 90, of the guide links 59 extending between the upper rear corners of the sidewalls 41 and 42, increases the effective capacity of a refuse hopper.

While the present invention has been disclosed with a specific arrangement and disposition of the parts, it should be expressly understood that numerous modifications and changes may be made without departing from the scope of the appended claims.

We claim:

1. In a refuse collecting vehicle body including a pivotal tailgate having a loading hopper with parallel upwardly extending sidewalls, an access opening at the rear of the hopper, an opening into the body at the front of the hopper, and having a packer blade extending across the hopper between the sidewalls for moving refuse from the hopper into the body, the improvement comprising a pair of parallel opposed guide tracks, one of said guide tracks in each of said sidewalls, guide means on the sides of said packer blade engaged with said guide tracks, a pair of parallel, opposed guide links, each of said guide links having a first end and a second free end, means for mounting each of said first ends of said guide links to one of said hopper sidewalls above said guide tracks in an upper rear quadrant thereof, said guide links being operatively mounted to said sidewalls on means extending between said guide links for pivotal movement around an axis of rotation extending between said sidewalls, said free ends of said guide links extending generally forwardly of such axis of rotation, means pivotally mounting each of said free ends of said guide links to said packer blade, said guide tracks and guide links being effective for guiding the movement of the bottom edge of said packer blade through a closed path from a first position adjacent the rear end of such body, thence rearwardly over refuse in said hopper, thence downwardly behind such refuse, and thence forwardly through said hopper to said first position for moving refuse out of said hopper into said body, means effective for preventing downward movement of said packer blade at the beginning of a rearward movement of said packer blade from said first position thereof, and power means connected to said packer blade for moving said packer blade.

2. Apparatus according to claim 1, including a torque tube rotatably mounted to and extending between said sidewalls, each of guide links having one end thereof fixably secured to said torque tube.

3. Apparatus according to claim 1 in which said power means is at least one hydraulic cylinder and rod, one end thereof being pivotally connected to said body and the other end thereof operatively connected to said packer blade.

4. Apparatus according to claim 2, in which said power means includes at least one hydraulic cylinder and wherein said packer blade and said hydraulic cylinder define an outer margin of movement as said packer blade moves through such closed path, said torque tube being mounted exteriorly of such outer margin.

5. Apparatus according to claim 1 including at least one track switch mounted adjacent said guide tracks, each of said track switches having a packer blade guide means engager openable by said packer blade guide means during the normal movement of said guide means as the packer blade traverses such closed path and being effective to prevent reverse movement of said packer blade guide means.

6. Apparatus according to claim 1 including track stop means located in each of said guide tracks and movable between a track open position for normal operation and a track closed position effective to block reverse movement of said packer blade guide means, whereby said power means may be energized to transmit power through said track stop means to said tailgate for swinging said tailgate around its pivotal mounting on said body.

7. In a refuse collecting vehicle body including a pivotal tailgate having a loading hopper with parallel upwardly extending sidewalls, an access opening at the rear of said hopper and an opening into the body at the front of the hopper, and having a packer blade extending across the hopper between the sidewalls for moving refuse from the hopper into the body, the improvement comprising, a pair of opposed, multi-sided, guide tracks, one in each of said sidewalls, guide means on the ends of said packer blade engaged with said guide tracks, a torque tube rotatably mounted to and extending between the upper rear corners of said sidewalls, a pair of horizontally spaced guide links, each of said guide links having a first end pivotally mounted to said packer blade, and a second end secured to said torque tube, said guide track and and said guide links being effective to guide the bottom edge of said packer blade through a closed path from a first position adjacent the rear end of said body, thence upwardly and rearwardly over refuse in said hopper, thence downwardly behind such refuse, and thence forwardly and upwardly through said hopper to said first position, at least one track switch pivotally mounted in each of said guide tracks, each of said track switches having a packer blade guide means engager openable by said packer blade guide means during the normal movement of said guide means as the packer blade traverses such closed path and being effective to prevent reverse movement of said packer blade guide means, power means for moving said packer blade around such path, said power means including at least one hydraulic cylinder and rod, one end thereof being pivotally connected to said body and the other end thereof being operatively connected to said packer blade, and track stop means located in each of said guide tracks and movable between a track open position for normal operation, and a track closed position effective to block reverse movement of said packer blade guide means, whereby said power means may be energized to transmit power through said track stop means to said tailgate for swinging said tailgate around its pivotal mounting on said body.

References Cited by the Examiner

FOREIGN PATENTS 1,166,080  6/1958  France.

GERALD M. FORLENZA, *Primary Examiner.*

ALBERT J. MAKAY, *Examiner.*